Dec. 15, 1970 H. G. HIRSBRUNNER 3,548,293
ELECTRO-THERMAL LOGIC APPARATUS
Filed May 20, 1968 2 Sheets-Sheet 1
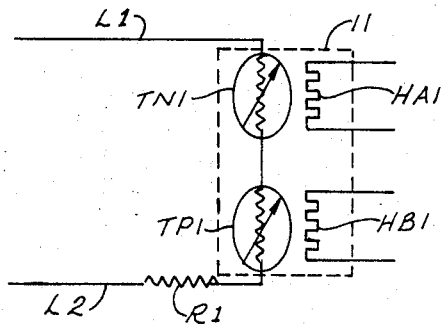
FIG. 1
FIG. 2
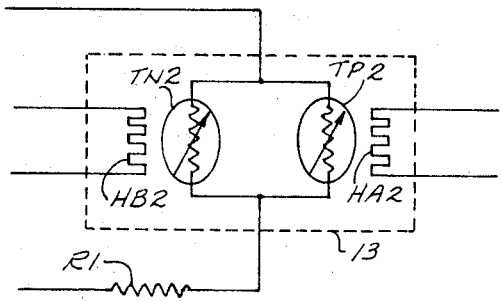
FIG. 3
FIG. 4
Hans G. Hirsbrunner,
Inventor.
Koenig, Senniger,
Powers and Leavitt,
Attorneys.

United States Patent Office 3,548,293
Patented Dec. 15, 1970

3,548,293
ELECTRO-THERMAL LOGIC APPARATUS
Hans G. Hirsbrunner, South Attleboro, Mass., assignor to Texas Instruments Incorporated, Dallas, Tex., a corporation of Delaware
Filed May 20, 1968, Ser. No. 730,300
Int. Cl. G05f 3/02
U.S. Cl. 323—69                                12 Claims

ABSTRACT OF THE DISCLOSURE

Various logic gates employ thermistors in various combinations to switch the state of energization of an electrical load in response to predetermined combinations of input signals. The input signals are in the form of heat applied to various ones of the thermistors.

---

This invention relates to logic apparatus and more particularly to such apparatus employing electro-thermal elements such as thermistors.

In various control applications, such as multizone heating and air-conditioning systems, the time of response of the associated control apparatus is typically not highly significant. Accordingly, switching and logic operations may be performed by elements which respond relatively slowly, e.g., electro-thermal elements such as thermistors. The use of electro-thermal control elements is advantageous because of their simplicity, reliability and relatively low cost. To provide flexibility in designng and in operation, however, it is important that various logic control operations be available such as are afforded by electronic components in the computer and automation arts.

Among the several objects of the present invention may be noted the provision of logic apparatus which will switch the state of energization of a load in response to various predetermined combinations of input signals; the provision of such apparatus in which the input signals may be in the form of temperature changes; the provision of such apparatus in which the energization of the load is controlled according to a predetermined logic pattern; the provision of such apparatus which is highly reliable; and the provision of such apparatus which is relatively simple and inexpensive. Other objects and features will be in part apparent and in part pointed out hereinafter.

Briefly, logic control apparatus of this invention includes a pair of thermistors which are opposite temperature coefficient types. Each thermistor is provided with respective means for applying heat thereto and the pair of thermistors are interconnected in a two-terminal network. An electrically energizable load is interconnected in a circuit with the network and with a source of electrical power so that the energization of the load is controlled as a function of conduction through the network. Accordingly, the state of energization of the load is switched in response to the application of heat to said thermistors according to a predetermined logic pattern.

The invention accordingly comprises the constructions hereinafter described, the scope of the invention being indicated in the following claims.

In the accompanying drawings, in which several of various possible embodiments of the invention are illustrated, FIG. 1 is a schematic circuit diagram of a logic gate of this invention connected to selectively energize an electrical load from a constant voltage source:

FIG. 2 is a logic table illustrating the operation of the gate of FIG. 1;

FIG. 3 is another logic gate of this invention also arranged to selectively energize an electrical load from a constant voltage source;

FIG. 4 is a logic table illustrating the operation of the gate of FIG. 3;

Corresponding reference characters indicate corresponding parts throughout the several views of the drawings.

Figure 5:
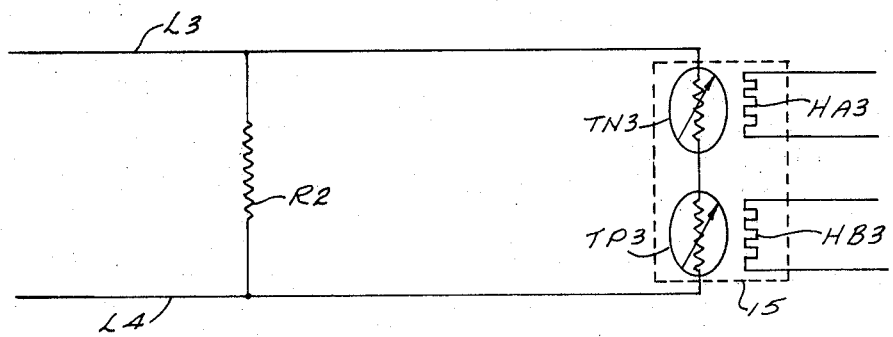
FIG. 5 is a schematic circuit diagram of a gate of this invention interconnected for selectively energizing an electrical load from a constant current source.

Referring now to FIG. 1, there is indicated at 11 generally an electro-thermal logic gate providing a so-called H function. This function is illustrated in the logic or truth table of FIG. 2 in which the presence of an input or output signal is indicated by a 1 and the absence of a signal is indicated by a 0. There are two inputs A and B and thus there are four possible input conditions, each causing a corresponding output condition as indicated under the heading "OUT."

Gate 11 includes a pair of thermistors TN1 and TP1. An electrically energizable load is represented by a resistor R1. This load may for example be constituted by a control device which is to be selectively energized, e.g., a solenoid or other actuator, or it may be a heater which, as will be apparent hereinafter, comprises an input element for further electro-thermal logic circuitry. A gate 11 and load resistor R1 are connected in series across a constant voltage source through a pair of supply leads L1 and L2 so that the load resistor R1 is energized when conduction is permitted through gate 11. The source voltage is selected to be below that which would produce any significant self-heating of the thermistors which comprise the gate, under any conditions of operation. The source may provide either A.C. or D.C.

The thermistor TN1 is of the NTC (negative temperature coefficient of resistivity) type and the thermistor TP1 is of the PTC (positive temperature coefficient of resistivity) type. The two thermistors are connected in series to constitute a two-terminal network which is in series with the load R1.

The thermistor TN1 is in heat exchange relationship with a heater HA1 and the thermistor TP1 is in heat exchange relationship with a heater HB1. As is described in greater detail hereinafter gate 11 responds to thermal input signals and the heaters HA1 and HB1 provide a convenient means for converting electrical signals to such thermal input signals. However, it should be understood that other variable temperature sources may be employed as controlling inputs to gate 11, e.g., ambient temperature changes, furnace temperatures, etc., and the means for applying heat from such sources to the thermistor may comprise merely means for placing or supporting the thermistors in heat exchange relationship with such sources.

The thermistors comprising gate 11 are preferably constructed of materials which exhibit relatively abrupt changes in resistance at predetermined temperature thresholds. Thus, as the temperature of one or the other of the thermistors is varied past the respective predetermined temperature threshold, the thermistor will experience a relatively large change in resistance value. In other words the NTC thermistor has a transition temperature above which the resistance of the thermistor decreases relatively abruptly and the PTC thermistor has a transition temperature above which the resistance of that thermistor rises relatively abruptly.

As the load resistor R1 is connected in series with the gate 11 across a constant voltage source, it will be seen by those skilled in the art that the load will be energized to a substantial extent when a low resistance current path is provided through the gate by both of the thermistors being in their low resistance states and that the load will be substantially deenergized if either of the thermistors is in its relatively high resistance states. It is assumed that the load is of a character which will respond to the relatively low and relatively high levels of energization produced by the gates of this invention in substantially the same manner as if its power source had been completely switched off or on. Similarly, in the remainder of the specification the thermistors will be treated as being conductive when they are in their low resistance states and non-conductive when they are in their high resistance states although it should be understood that it is relative conduction or non-conduction which is meant and that a change in resistance by a relatively small factor may be sufficient to suitably vary the energization of an appropriate load.

In the logic table of FIG. 2, the various possible combinations of thermal inputs to the thermistors TN1 and TP1 by the heaters HA1 and HB1 are indicated in the columns headed A and B respectively. In these columns the application of heat, e.g., by energization of the respective heater, is indicated by the binary digit 1 whereas no thermal input is indicated by the binary digit 0. The energization of the load resistor R1 is indicated in the column headed "OUT" by a binary 1 and its deenergization by the binary digit 0.

When both of the thermistors are at a relatively cool temperature, e.g., at normal ambient temperature, the path of conduction between the voltage source and load resistor R1 is blocked by the high resistance of the NTC thermistor TN1 and the load is deenergized. If heater HA1 alone is energized so that the temperature of the thermistor TN1 is raised above its thresholds, a conduction path will be created and the load resistor R1 will be energized. If only heater HB1 is energized, however, the conduction path is doubly blocked by the high resistances of both thermistors. If both heaters HA1 and HB1 are energized, conduction is blocked by the high resistance of PTC thermistor TP1. Accordingly, it can be seen that the state of energization of load resistor R1 is switched between energization and deenergization according to the H gate logic pattern as represented in FIG. 2 and that the load is energized only if the heater HA1 alone is energized.

In the embodiment illustrated in FIG. 3, the load resistor R1 is connected across the supply leads L1 and L2 through an electro-thermal gate 13 which, as described hereinafter, provides energization of resistor R1 according to an $\overline{H}$ or H complement gate pattern of logic as shown in FIG. 4. Gate 13 includes two thermistors TN2 and TP2 which are essentially similar to the thermistors TN1 and TP1, respectively, of FIG. 1. Thermistors TN2 and TP2 are, however, connected in parallel to constitute a two-terminal network which is in series with load R1.

A heater HB2 is provided for applying heat to the thermistor TN2 so as to selectively raise its temperature above the respective transition threshold and a heater HA2 is similarly provided for applying heat to the thermistor TP2. It should be noted that the A input is associated with the PTC thermistor in this embodiment and that the B input is associated with the NTC thermistor, this arrangement being complementary to the relationship which existed in the FIG. 1 embodiment.

As illustrated in the logic table of FIG. 4, the load resistor R1 is energized except when the heater HA2 alone is energized. When both heaters are deenergized, a conduction path exists through the PTC thermistor TP2. When both heaters are energized, a conduction path exists through the NTC thermistor TN2. However, if only heater HA2 is energized, both the PTC thermistor TP2 and the NTC thermistor TN2 will be in their high resistance conditions and thus all possible conduction paths to the load resistor R1 will be blocked. If only the heater HB2 is energized, a conduction path exists through the PTC thermistor TP2. Accordingly, the energization of load resistor R1 follows the $\overline{H}$ gate logic pattern represented in FIG. 4.

As will be readily understood by those skilled in the binary logic arts, the load energization pattern provided by the $\overline{H}$ gate is the complement of that provided by the H gate.

In the embodiment illustrated in FIG. 5, a load resistor R2 is connected in parallel with an electro-thermal gate 15. In other words, the gate 15 shunts the load resistor R2. A substantially constant current is supplied to the parallel combination of the load resistor and the gate through a pair of supply leads L3 and L4. Thus, when the gate 15 is in a non-conducting state, the current supplied through leads L3 and L4 will flow through and energize the load resistor R2 whereas when the gate is in a conducting state the current will be shunted away from resistor R2 thereby substantially deenergizing it.

Gate 15 is substantially identical with gate 11 of FIG. 1 and comprises an NTC thermistor TN3 and a PTC thermistor TP3 which are connected in series to provide a two-terminal network. Each of the thermistors TN3 and TP3 is provided with a respective heater HA3 and HB3, for applying a thermal input signal thereto. The current provided through leads L3 and L4 is held to a low level such that there is no significant self-heating of the thermistors comprising the gate 15.

Since the load R2 is energized when the gate 15 is non-conducting and is deenergized when the gate conducts, due to the parallel connection of the gate and the load, the logic pattern of energization of the load is the complement of that provided by the gate 11 in the circuit of FIG. 1 even though the internal connections of the gates 11 and 15 are substantially identical. Thus the gate 15 in fact provide the $\overline{H}$ gate logic function illustrated in FIG. 4.

Figure 6:
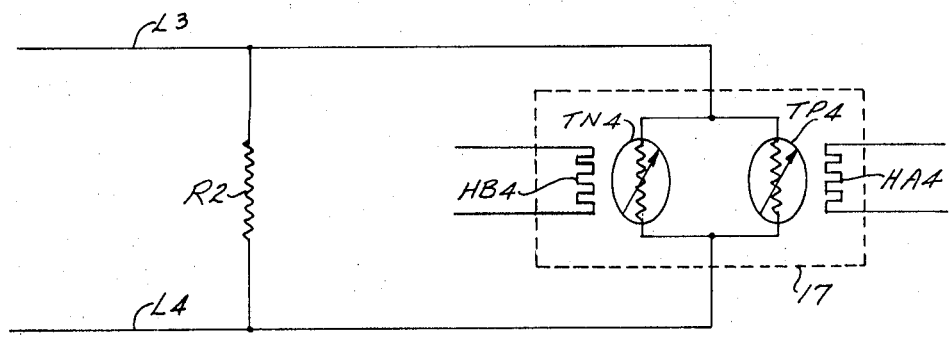
FIG. 6 is a schematic circuit diagram of another gate of this invention also interconnected for energizing a load from a constant current source.

Similarly, in FIG. 6 there is illustrated a circuit employing a gate 17 which is substantially identical to the gate 13 of FIG. 3 but which is connected in parallel with its load (R2) across a current source rather than in series with the load across a voltage source. The gate 17 comprises a PTC thermistor TP4 and an NTC thermistor TN4 connected in parallel, each thermistor being thermally coupled to a respective heater HA4 and HB4. While the gate 17 conducts under the same conditions as the gate 13, the energization of the load R2 follows the H gate pattern illustrated in FIG. 2 due to the parallel, rather than series, connection of gate and load.

It should be noted that in each embodiment the continued energization of the load depends upon the continued maintenance of the conditions required by the respective logic pattern.

In view of the above, it will be seen that the several views of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. Logic apparatus comprising
a pair of thermistors which are of opposite temperature coefficient types;
respective, independently operable means for selectively applying heat to each thermistor in accordance with a predetermined logic pattern so as to control the conductivity of each of said thermistors;
circuit means interconnecting said thermistors in a two-terminal network;
an electrically energizable load; and
circuit means interconnecting said network and said load in series across a source of electrical power for controlling the energization of said load in response to the conductivity of said thermistors so as to control the state of energization of said said load in accordance with the predetermined logic pattern.

2. Apparatus as set forth in claim 1 wherein said thermistors are connected in parallel thereby providing said two-terminal network.

3. Apparatus as set fourth in claim 1 wherein said thermistors are connected in series thereby providing said two terminal network.

4. Apparatus as set forth in claim 1 wherein one of said thermistors has a transition temperature above which the resistance of said one thermistor decreases relatively abruptly and the other of said thermistors has a transition temperature above which the resistance of said other thermistor rises relatively abruptly.

5. Apparatus as set forth in claim 1 wherein said means for applying heat to said thermistor comprises respective independently energizable electric heaters.

6. Apparatus as set forth in claim 1 wherein said source provides a substantially constant voltage.

7. Logic apparatus comprising:
a first thermistor which is of the NTC type;
a second thermistor which is of the PTC type;
respective, independently operable means for selectively applying heat to each thermistor in accordance with a predetermined logic pattern so as to control the conductivity of each of said thermistors;
circuit means interconnecting said thermistors in a two-terminal network;
an electrically energizable load; and
circuit means interconnecting said network and said load in parallel across a source of electrical power for controlling the energization of said load in response to the conductivity of said thermistors so as to control the state of energization of said load in accordance with the predetermined logic pattern.

8. Apparatus as set forth in claim 7 wherein said thermistors are connected in parallel thereby providing said two-terminal network.

9. Apparatus as set forth in claim 7 wherein said thermistors are connected in series thereby providing said two-terminal network.

10. Apparatus as set forth in claim 7 wherein said source provides a substantially constant current.

11. Logic apparatus comprising:
a first thermistor having a transition temperature above which the resistance of said first thermistor decreases relatively abruptly;
a second thermistor having a transition temperature above which the resistance of said second thermistor rises relatively abruptly;
a respective, independently energizable heater for selectively applying heat to each thermistor in accordance with a predetermined logic pattern so as to control the conductivity of each thermistor;
circuit means interconnecting said first and second thermistors in parallel thereby providing a two-terminal network;
an electrically energizable load; and
circuit means interconnecting said network and said load with a source of electrical power for controlling the energization of said load in response to the conductivity of said thermistors so as to control the state of energization of said load in accordance with the predetermined logic pattern.

12. Logic apparatus comprising:
a first thermistor having a transition temperature above which the resistance of said first thermistor decreases relatively abruptly;
a second thermistor having a transition temperature above which the resistance of said second thermistor rises relatively abruptly;
a respective, independently energizable heater for selectively applying heat to each thermistor in accordance with a perdetermined logic pattern so as to control the conductivity of each thermistor;
circuit means interconnecting said first and second thermistors in series thereby providing a two-terminal network;
an electrically energizable load; and
circuit means interconnecting said network and said load with a source of electrical power for controlling the energization of said load in response to the conductivity of said thermistors so as to control the state of energization of said load in accordance with the predetermined logic pattern.

References Cited

UNITED STATES PATENTS

| | | | |
|---|---|---|---|
| 2,533,287 | 12/1950 | Schmitt | 323—68 |
| 3,025,455 | 3/1962 | Jonsson | 323—68 |
| 3,199,087 | 8/1965 | Foglia | 323—68X |
| 3,217,241 | 11/1965 | Moreines | 323—69 |
| 3,316,765 | 5/1967 | Trolander et al. | 73—362 |
| 3,321,716 | 5/1967 | Lyon-Caen | 307—310X |

WILLIAM M. SHOOP, JR., Primary Examiner

A. D. PELLINEN, Assistant Examiner

U.S. Cl. X.R.

219—505; 307—117; 323—81; 328—3